(12) United States Patent
Bruce et al.

(10) Patent No.: US 6,214,493 B1
(45) Date of Patent: Apr. 10, 2001

(54) MANGANESE OXIDE BASED MATERIAL FOR AN ELECTROCHEMICAL CELL

(75) Inventors: Peter George Bruce, Newport-on-Tay; Anthony Robert Armstrong, St Andrews, both of (GB)

(73) Assignee: The University Court of the University of St. Andrews, St. Andrews (GB)

( * ) Notice: Subject to any disclaimer, the term of this patent is extended or adjusted under 35 U.S.C. 154(b) by 0 days.

(21) Appl. No.: 09/101,870
(22) PCT Filed: Jan. 8, 1997
(86) PCT No.: PCT/GB97/00031
§ 371 Date: Aug. 9, 1999
§ 102(e) Date: Aug. 9, 1999
(87) PCT Pub. No.: WO97/26683
PCT Pub. Date: Jul. 24, 1997

(30) Foreign Application Priority Data

Jan. 15, 1996 (GB) .................................... 9600772

(51) Int. Cl.[7] .................................................. H01M 4/50
(52) U.S. Cl. .................. 429/224; 429/231.9; 429/218.1; 423/599; 423/179.5
(58) Field of Search ................................ 429/224, 231.9, 429/231.95, 218.1; 423/599, 179.5

(56) References Cited

U.S. PATENT DOCUMENTS

| | | | |
|---|---|---|---|
| 5,558,961 | 9/1996 | Doeff | 429/224 |
| 5,780,181 | * 7/1998 | Idota et al. | 429/194 |
| 5,938,798 | * 7/1999 | Hanawa et al. | 29/623.1 |

FOREIGN PATENT DOCUMENTS

| | | |
|---|---|---|
| 0 556 555 | 8/1993 | (EP) . |
| 0 581 290 | 2/1994 | (EP) . |
| 0 624 552 | 11/1994 | (EP) . |
| 0 656 667 | 6/1995 | (EP) . |
| 2 242 898 | 10/1991 | (GB) . |

* cited by examiner

Primary Examiner—Maria Nuzzolillo
Assistant Examiner—Raymond Alejandro
(74) Attorney, Agent, or Firm—Lee, Mann, Smith, McWilliams, Sweeney & Ohlson

(57) ABSTRACT

A novel layered material for use in electrochemical cells is provided, together with a method for producing the layered material, and a cell having the layered material as the positive electrode. The material is of the form $Q_qMn_yM_zO_2$, where Q and M are each any element, y is any number greater than zero, and q and z are each any number greater than or equal to zero, and the material has a layered structure. Methods of preparing the manganese oxide material are provided, using an ion exchange reaction or an ion removal reaction. Use of the material in an electrochemical cell is demonstrated.

20 Claims, 4 Drawing Sheets

MANGANESE OXIDE BASED MATERIAL FOR AN ELECTROCHEMICAL CELL

FIELD OF THE INVENTION

This invention concerns electrochemical cells and relates to a novel layered material for use in such cells, a method for producing the layered material, and a cell having the layered material as the positive electrode.

BACKGROUND OF THE INVENTION

Electrochemical cells generally have a negative electrode, a positive electrode, and an electrolyte placed between the electrodes. The electrolyte is chosen so that transfer of ions between the two electrodes occurs, thus producing an electrical current. One example of an electrochemical cell is a rechargeable battery. The use of non-layered $LiMnO_2$ in secondary batteries is proposed in JP 6036799. The use of layered materials such as lithium cobalt oxide, $LiCoO_2$, as the positive electrode in such a rechargeable battery is well established. The layered material $LiCoO_2$ consists of sheets of oxygen ions stacked one on top of the other. Between the first and second layers of oxygen are located the cobalt ions, with the lithium ions being located between the second and third oxygen layers. Use of $LiCoO_2$ in rechargeable batteries allows greater energy storage per unit weight and volume than is possible in conventional rechargeable batteries such as nickel-cadmium. However $LiCoO_2$ has disadvantages in that it is somewhat toxic, has limited energy storage capacity, and the cobalt containing materials from which it is produced are expensive and scarce.

Attempts have been made to use other compounds with a similar layered structure to that of $LiCoO_2$, such as $LiNiO_2$, and $LiFeO_2$. EP 0 017 400 discloses a range of compounds having layers of the $\alpha$-$NaCrO_2$ structure and GB 2242898 discloses a range of compounds with a layering intermediate that of a $ABO_2$ structure and a spinel-type structure $A(B_2)O_4$. However, preparation of the materials according to the present invention is not taught and could not be achieved; see for example E. Rossen, C. D. W. Jones, and J. R. Dahn, "Structure and electrochemistry of $Li_xMn_yNi_{1-y}O_2$", Solid State Ionics, 57 (1992), 311–318.

It is one aim of the present invention to provide a novel layered manganese oxide material which can be used in electrochemical cells.

SUMMARY OF THE INVENTION

According to one aspect of the present invention, there is provided a manganese oxide material, wherein the material is of the form $Q_qMn_yM_zO_2$, where Q is any Group I element, i.e. K, Li, Rb, M is any element, y is any number greater than zero, q and z are each any number greater than or equal to zero, and the material has a layered structure.

A layered structure is one in which the ions are arranged in a series of generally planar layers, or sheets, stacked one on top of another. In general, each layer contains ions of one particular element, although the layer of Mn ions may contain M ions if present. Thus, when z is equal to zero and q is greater Man zero, the layering will consist of sheets of oxide ions which are separated by alternating layers of Q ions and Mn ions, i.e. the layers order as a layer of oxide ions, a layer of Mn ions, a layer of oxide ions, a layer of Q ions and a layer of oxide ions; this is repeated throughout the structure.

Where z is not equal to zero, y+z is preferably chosen to equal one. In such a material, the M ions will occupy sites in the Mn layers.

Where z is not equal to zero, the element M is typically chosen from Group II elements, the transition elements or from Group III elements. Suitable elements include Be, Mg, Ca, Sc, Ti, V, Cr, Fe, Co, Ni, Cu, Zn, Al, Ga, P.

Accordingly in a particularly preferred material according to the invention, Q is an alkali metal ion, such as Rb, K or Li, and M is a transition metal ion.

Preferably Q is chosen to be Li, so that the material is of the form $Li_wMn_yM_zO_2$, where w is any number greater than zero.

The layered structure preferably possesses a crystal symmetry lower than rhombohedral. A preferred symmetry for the layered structure is monoclinic. The monoclinic structure possesses one 2-fold axis and/or one plane of symmetry, its unit cell possessing three unequal axes, one axis being perpendicular to the other two axes which are inclined at an oblique angle, $\beta$. In such a structure the Mn ions are not equally spaced from all nearest neighbour oxide ions, i.e. the three oxide ions in the adjacent upper layer and the three oxide ions in the adjacent lower layer, but rather are distorted from equal spacing so that the Mn—O bond distance varies. An equivalent view of this is that the layered structure comprises layers of $MnO_6$ polyhedra separated by layers of other ions, for example lithium ions.

Preferably the material is $LiMnO_2$, having a layered monoclinic structure.

In a simple alternative the material may be of the form $Mn_yO_2$, where the layers order as a layer of oxide ions, a layer of Mn ions; this being repeated throughout the structure. The layered structure of this material is rhombohedral, with the Mn ions being equally spaced from all nearest neighbour oxide ions, i.e. the three oxide ions in the adjacent upper layer and the three oxide ions in the adjacent lower layer, so that the Mn—O bond distance is constant. An equivalent view of this is that the layered structure comprises successive layers of $MnO_6$ octahedra.

According to a further aspect of the invention, there is provided a method of preparing a manganese oxide material of the invention, comprising processing an intermediate material $X_xMn_yM_zO_2$, where X is a Group I element not being lithium, M is any element, x and y are each any number greater than zero, and z is any number greater than or equal to zero, by an ion exchange reaction with a reactant containing lithium ions, so as to replace X with lithium and produce a material of the form $Li_wMn_yM_zO_2$, where w is any number greater than zero, and the material has a layered structure.

Preferably X is chosen to be Na, so that the intermediate material is of the form $Na_xMn_yM_zO_2$.

More preferably y is equal to one and z is equal to zero, so that the intermediate material is of the form $NaMnO_2$. The use of such an intermediate material results in production of a layered material of the form $LiMnO_2$, having a layered monoclinic structure as described above.

The reactant may be any suitable lithium salt, such as LiBr or LiCl. Preferably the ion exchange reaction is achieved by heating the reactant and intermediate material under reflux. Typically n-pentanol, n-hexanol or n-octanol are used as the reflux agent, with the reflux period being 6–8 hours.

According to a further aspect of the invention, there is provided a method of preparing a manganese oxide material of the invention, comprising processing a precursor material $Q_qMn_yM_zO_2$, where Q and M are each any element, q and y are each any number greater than zero, and z is any number greater than or equal to zero, by carrying out an ion If removal reaction, so as to remove Q and produce a material of the form $MN_yM_zO_2$, with a layered structure.

Ion removal is conveniently achieved by electrochemical extraction, using the precursor material as the working electrode in an electrochemical cell. This is of particular advantage in preparation of materials of the form $Mn_yO_2$. For preparation of these materials, Q is preferably chosen from the Group I elements, such as Na, K, Rb. The $Mn_yO_2$ may be subsequently processed to insert lithium so as to produce $Li_wMn_yO_2$.

According to another aspect of the invention, there is provided an electrochemical cell, wherein the positive electrode is of the form $Li_qMn_yM_zO_2$, where M is any element, y is any number greater than zero, and q and z are each any number greater than or equal to zero. The use of the manganese in the electrode avoids the need for use of cobalt or nickel which is of advantage as manganese is less toxic, more abundant and cheaper than cobalt and nickel.

Preferably y and q are equal to one, and z is equal to zero, with the preferred electrode material being $LiMnO_2$.

A rechargeable battery is an example of an electrochemical cell with which the invention may be used.

The invention will now be described by way of example, and with reference to the accompanying Figures in which.

DESCRIPTION

EXAMPLE 1

Figure 1:
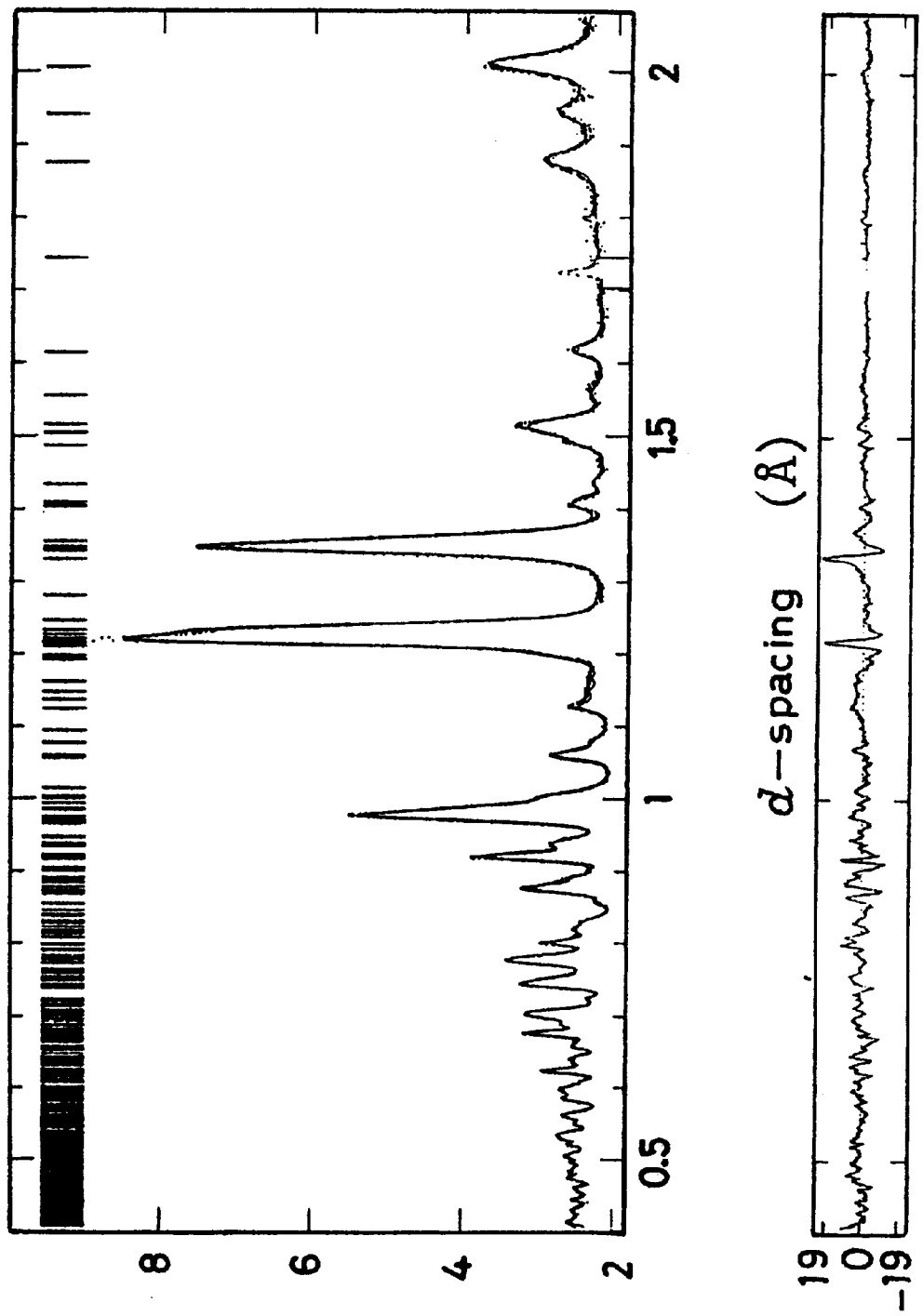
FIG. 1 shows the observed diffraction data of the material obtained from the method according to the invention, and the fit of a theoretical diffraction pattern assuming a layered monoclinic model.

A material $LiMnO_2$, being a preferred embodiment of the invention will now be described by way of example. The preparation of the material $LiMnO_2$ and the experimental verification of its structure and its properties as an electrode for an electrochemical cell will be described.

Preparation of $LiMnO_2$

Preparation of $LiMnO_2$ required two stages:
1) The preparation of the intermediate material, sodium manganese oxide, $NaMnO_2$; and
2) Ion exchange reaction.

Stage 1) is largely known from the literature, see Fuchs and Kemmler-Sack, Solid State Ionics 68, 279, 1994. Stoichiometric quantities of sodium carbonate, $Na_2CO_3$, and manganese (III) oxide, $Mn_2O_3$, are weighed out, intimately mixed and ground under acetone in an agate mortar and pestle until a homogeneous mixture is obtained. The acetone is allowed to evaporate and the mixture transferred to a crucible and heated in a tube furnace at 700–730° C. for 18–72 hours under flowing argon. The optimal heating time to ensure the best density and homogeneity of the resulting material is 48 hours.

After heating the sample is furnace cooled and then removed from the furnace. Phase purity of the resulting $NaMnO_2$ was confirmed by powder X-ray diffraction. Materials of the form $NaMn_yM_zO_2$ (where M=Be, Mg, Ca, Sc, Ti, V, Cr, Fe, Co, Ni, Cu, Zn, Al, Ga, P etc) may be prepared by using the appropriate oxide to replace some of the $Mn_2O_3$.

In stage 2), a 10 to 15 fold excess of lithium chloride, LiCl, i.e. 5 g., or lithium bromide, LiBr, i.e 10 g, is added to a round bottomed flask containing 100 ml of either n-pentanol, n-hexanol, or n-octanol. 1 g of the previously prepared $NaMnO_2$ is added to the mixture in the flask, a condenser attached and the mixture heated under reflux for a period of 6 to 8 hours. Refluxing temperatures are around 130° C. for n-pentanol, 145–150° C. for n-hexanol and 180–185° C. for n-octanol. After cooling to room temperature, the product is filtered under suction, washed firstly with the appropriate alcohol and then with ethanol, and finally dried. Phase purity of the resulting product material was confirmed by powder X-ray diffraction.

The structure of the product produced according to the method was then determined by neutron diffraction. Determination of the structure by this method requires the observed diffraction data from a representative sample of the product to be compared to theoretical diffraction data for a variety of structural models. The correct structural model produces the best fit between theoretical and observed data. Typically trial models are selected by looking at the structures of similar families of compounds, or from the structures of the compounds that formed the product.

To analyse the structure of the material formed from the above described method, two models were tested. The first assumed that the layered monoclinic structure of the parent $NaMnO_2$ was retained after the ion exchange reaction. The second model assumed a tetragonal spinel structure as adopted by $Li_2Mn_2O_4$, i.e. not a layered structure like the cobalt or nickel compounds discussed above but rather a completely different three dimensional structure. It should be understood that other compounds with the $LiMnO_2$ composition have been prepared in the past but with completely different structures. It is known that orthorhombic $LiMnO_2$, low temperature "orthorhombic" $LiMnO_2$ and tetragonal spinel $Li_2Mn_2O_4$ may be produced.

Time-of-flight powder neutron diffraction data were collected on the POLARIS high intensity, medium resolution diffractometer at the ISIS pulsed source at the Rutherford Appleton Laboratory. Data from the highest resolution backscattering bank of detectors were used for structural analysis.

Figure 3:
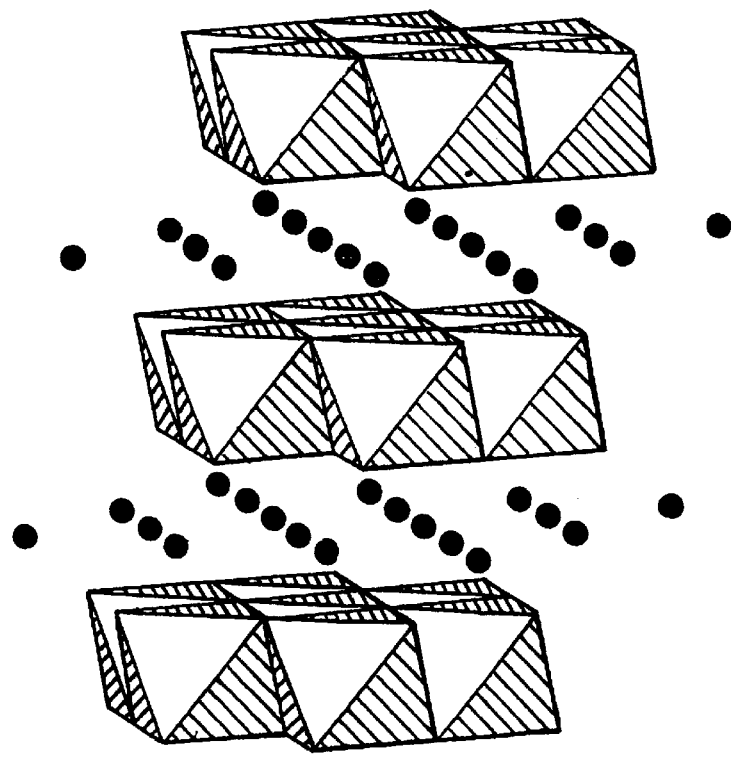
FIG. 3 shows a representation of $LiMnO_2$ assuming a monoclinic layered model.

The observed diffraction data were compared with theoretical data for each of the two models. The fit of the real and theoretical data for the monoclinic layered structure is shown in FIG. 1. FIG. 3 shows a representation of this model as it is thought to relate to $LiMnO_2$; $MnO_6$ polyhedra shown, with Li ions as circles. The structure shown in FIG. 3 is layered and related to the structure of $LiCoO_2$, described above. However due to the presence of the Jahn-Teller active ion $Mn^{3+}$, the structure is distorted from that of $LiCoO_2$. The main difference is that the crystal symmetry is lowered from rhombohedral ($LiCoO_2$) to monoclinic ($LiMnO_2$). The $MnO_6$ polyhedra have a lower symmetry that of the $CoO_6$ polyhedra as the $MnO_6$ polyhedra are considerably distorted compared with those of $CoO_6$. The $CoO_6$ polyhedra are octahedral. Table 1 below shows relative site occupancies and positions of the atoms within this material when using the monoclinic structure.

Figure 2:
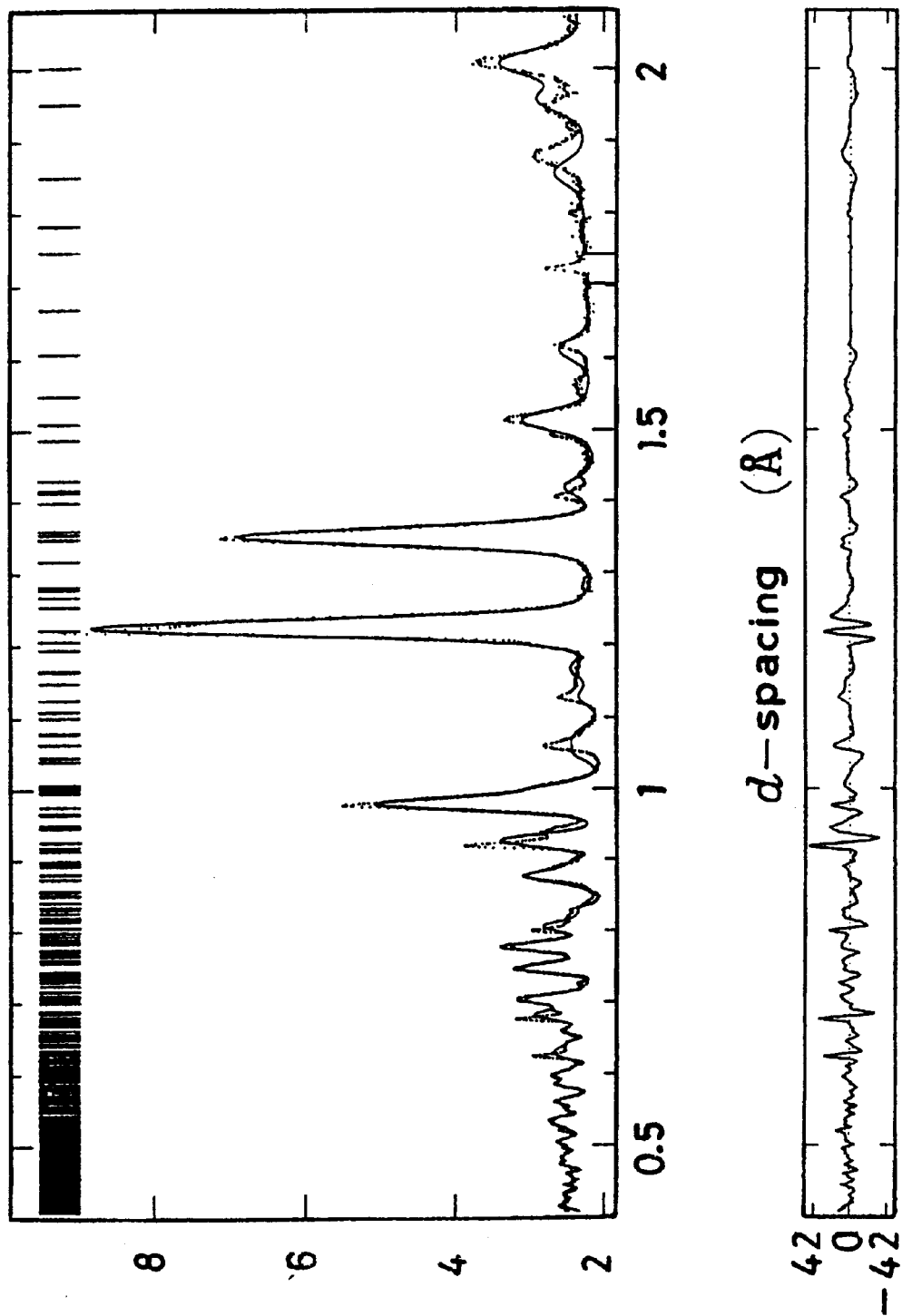
FIG. 2 shows the observed diffraction data of the material obtained from the method according to the invention, and the fit of a theoretical diffraction pattern assuming a tetragonal spinel model.

The fit of the real and theoretical data in the case of the tetragonal ($Li_2Mn_2O_4$ spinel) structure is shown in FIG. 2.

Figure 4:
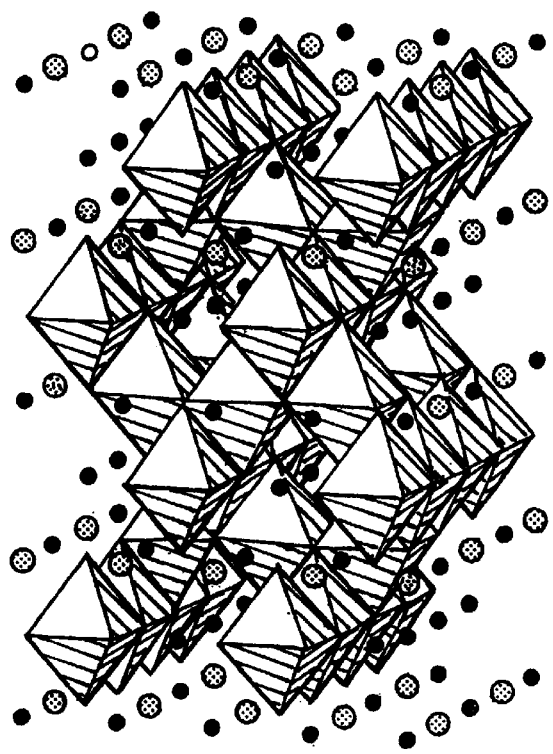
FIG. 4 shows a representation of $LiMnO_2$ assuming a tetragonal spinel model.

FIG. 4 shows a representation of the model applied to $LiMnO_2$; $MnO_6$ polyhedra are shown, with Li ions as light circles and Mn ions as dark circles. Table 2 below shows the relative site occupancies and positions of the atoms if this model applied.

TABLE 1

Results obtained on fitting a layered monoclinic structure to the observed data, space group C2/m (no. 12).

| Atom | Wyckoff symbol | x | y | z | $B_{eq}$ | Site Occupancy |
|---|---|---|---|---|---|---|
| Li1/Mn1 | 2d | 0 | 0.5 | 0.5 | 2.4(2) | 0.91/0.09(4) |
| Li2/Mn2 | 2a | 0 | 0 | 0.0 | 0.72(6) | 0.10/0.90(3) |
| O1 | 4i | 0.2723(3) | 0 | 0.7706(2) | 0.68(4) | 1 | a = 5.4387(7), b = 2.80857(4), c = 5.3878(6) Å, β = 116.006(3)°
$\chi^2$ = 11.83 ($R_{exp}$ = 0.60%, $R_p$ = 1.86%, $R_{wp}$ = 2.06%, $R_1$ = 3.98%)

TABLE 2

Results obtained on fitting a tetragonal structure to the observed data, space group I4₁/amd (no. 141).

| Atom | Wyckoff symbol | x | y | z | $B_{eq}$ | Site Occupancy |
|---|---|---|---|---|---|---|
| Li | 8c | 0 | 0 | 0 | 3.6(5) | 1 |
| Mn | 8d | 0 | 0 | 0.5 | 0.12(5) | 1 |
| 0 | 16h | 0.0 | 0.4826(5) | 0.2552(3) | 0.39(5) | 1 | a = 5.66632(6), b = 5.66632, c = 9.1852(2) Å
$\chi^2$ = 63.50 ($R_{exp}$ = 0.60%, $R_p$ = 4.00%, $R_{wp}$ = 4.79%, $R_1$ = 6.58%)

It can be seen from the analysis presented in Tables 1 and 2, and FIGS. 1 and 2, that the best fit, i.e. that with least error, see $\chi^2$ value and R values, is obtained for the monoclinic structure. The method according to the invention has thus produced monoclinic layered $LiMnO_2$.

The performance of the monoclinic $LiMnO_2$ in an electrochemical cell was then investigated. Investigation into the properties of $LiMnO_2$ was undertaken using a three electrode cell composed of lithium metal counter and reference electrodes. The working electrode. i.e. the positive electrode was fabricated by compressing powdered $LiMnO_2$ (80%), carbon black (13.3%) and PTFE (6.7%) on to a metal grid. The electrolyte was $LiClO_4$ dissolved in propylene carbonate. $LiClO_4$ was rigorously dried by heating under vacuum at 150° C. and the solvent was distilled using a Fischer HMS 500C distillation apparatus with 90 theoretical plates. The cell with an electrolyte solution of 1 M $LiClO_4$ in propylene carbonate was subjected to charging at a current of 10 $\mu Acm^{-2}$.

Figure 5:
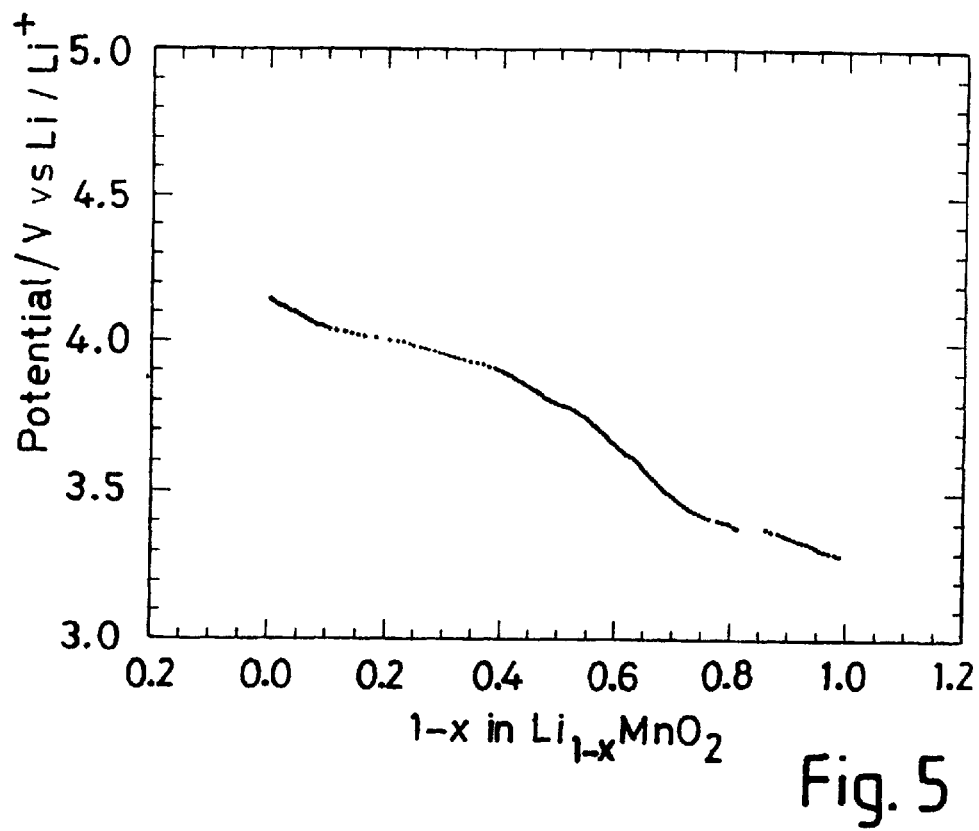
FIG. 5 shows the voltage response of an electrolytic cell using $Li_{1-x}MnO_2$, as 1-x varies.
Figure 6:
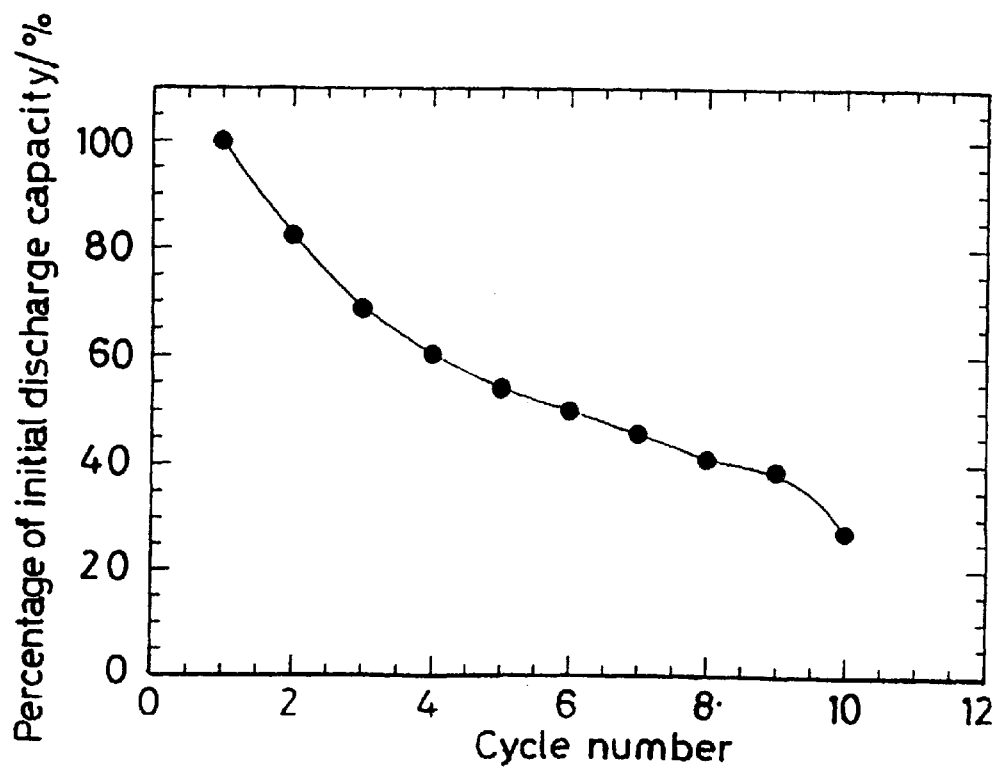
FIG. 6 shows the percentage of initial discharge capacity on successive discharge cycles of the cell.

The resulting voltage of this cell as a function of lithium content is shown in FIG. 5. Two voltage plateaux are visible; one at 3.4V, the other at 4V vs. $Li^+(1 M)/Li$. The maximum voltage of 4.1V is obtained for 1−x=0, i.e. for $MnO_2$. The cell was cycled at a constant current of 0.5 $mAcm^{-2}$ between the potential limit 3.4 and 4.3 V to simulate the behaviour of a rechargeable battery. This cycling data is shown in FIG. 6, with the percentage of initial discharge capacity shown for successive cycles. It will be seen that capacity declines on cycling. However the voltage range has not been optimised and includes both plateaux. FIG. 6 demonstrates that lithium can be chemically or electrochemically extracted from $LiMnO_2$ and reinserted into this compound, i.e. it is an intercalation/insertion electrode.

As demonstrated in the above preparation of $LiMnO_2$, it is possible to ion exchange sodium for lithium in $NaMnO_2$. As a variant of this, sodium can be electrochemically or chemically extracted from this $NaMnO_2$ yielding a material with a layered structure and the formula $MnO_2$. Typically this involves an electrochemical cell in which $NaMnO_2$ is the working electrode and passing a constant current through the cell. Such a cell may be a cell such as that described above for $LiMnO_2$, but using sodium counter and reference electrodes and a solution of $NaClO_4$ in propylene carbonate. The electrode material is thus oxidised, removing sodium and converting $Mn^{3+}$ to $Mn^{4+}$, producing $MnO_2$. An alternative synthesis of $LiMnO_2$ may then be carried out by insertion of lithium into the $MnO_2$.

EXAMPLE 2

Synthesis of $NaMn_{1-x}M_xO_2$

Two methods were used to prepare compounds of the form $NaMn_{1-x}M_xO_2$. The first preparation involved weighing stoichiometric quantities of sodium carbonate ($Na_2CO_3$) (or a slight $Na_2CO_3$ excess) and managanese (III) oxide ($Mn_2O_3$) and the appropriate other metal oxide e.g. cobalt oxide ($Co_3O_4$), nickel (II) oxide (NiO), iron (III) oxide $Fe_2O_3$) and intimately mixing and grinding under acetone in an agate mortar and pestle until a homogeneous mixture was obtained. Once the acetone had evaporated the mixture was transferred to a crucible and heated in a furnace at 650–750° C. for 10–72 hours in air. The sample was cooled to below 200° C. before removal from the furnace. Phase purity was confirmed by powder X-ray diffraction.

The second preparation involved weighing out appropriate quantities of manganese (II) acetate $(Mn(CH_3COO)_2 \cdot 4H_2O)$ and the other metal salt e.g. cobalt (II) acetate $(Co(CH_3COO)_2 \cdot 4H_2O)$ or nickel (II) acetate $(Ni(CH_3COO)_2 \cdot 4H_2O)$ and dissolving them in distilled water. A stoichiometric quantity of sodium carbonate ($Na_2CO_3$), or a slight $Na_2CO_3$ excess, was weighed out into a separate vessel and dissolved in distilled water. The two solutions were then mixed and stirred. The water was then removed on a rotary evaporator. The resulting solid was transferred to a crucible and heated in a furnace at 180–300° C. for 2–24 hours in air. The sample was cooled to below 100° C. before removal from the furnace; it was then ground in an agate mortar and pestle, transferred to a crucible with a lid and heated in a furnace at 500–850° C. for 1–60 hours in air. Samples were removed from the furnace at this temperature or after cooling. Phase purity was confirmed by powder X-ray diffraction.

Subsequent processing of either preparation was as described in Example 1 above.

What is claimed is:

1. A manganese oxide material wherein the material is of the form $Q_qMn_yM_zO_2$, where Q is a group I element, M is another element, $y$ is a number greater than zero, $q$ and $z$ are each a number greater than or equal to zero, wherein the material comprises a layered structure of ions, which ions are arranged in a series of generally planar layers stacked one on top of another with successive layers of oxide ions separated by alternating layers of Q ions, the layers thereby being arranged in a repeating sequence comprising a layer of Q ions, a layer of oxide ions, a layer of Mn ions and a further layer of oxide ions.

2. A manganese oxide material according to claim 1, wherein y+z is chosen to equal one.

3. A manganese oxide material according to claim 1, wherein Q is an alkali metal ion and M is a transition metal ion.

4. A manganese oxide material according to claim 1, wherein Q is chosen to be Li, so that the material is of the form $L_wMn_yM_zO_2$, where w is any number greater than zero.

5. A manganese oxide material according to claim 1, wherein the layered structure possesses a crystal symmetry lower than rhombohedral.

6. A manganese oxide material according to claim 1, wherein the material has a layered monoclinic structure.

7. A manganese oxide material according to claim 1, wherein the material is $LiMnO_2$, having a layered monoclinic structure.

8. A manganese oxide material according to claim 1, wherein the material is of the form $Mn_yO_2$.

9. A method of preparing a manganese oxide material, comprising processing an intermediate material $X_xMn_yM_zO_2$, where X is a Group I element not being lithium, M is an element, x and y are each a number greater than zero, and z is a number greater than or equal to zero, by an ion exchange reaction with a reactant containing lithium ions, so as to replace X with lithium and produce a material of the form $Li_wMn_yM_zO_2$, where w is a number greater than zero, and the material has a layered structure of ions, which ions are arranged in a series of generally planar layers stacked one on top of another with successive layers of oxide ions separated by alternating layers of X ions, the layers thereby being arranged in a repeating sequence comprising a layer of X ions, a layer of oxide ions, a layer of Mn ions and a further layer of oxide ions.

10. A method according to claim 9, wherein X is chosen to be Na, so that the intermediate material is of the form $Na_xMn_yM_zO_2$.

11. A method according to claim 9, wherein y is equal to one and z is equal to zero, so that the intermediate material is of the form $NaMnO_2$.

12. A method according to claim 9, wherein the reactant is a lithium salt.

13. A method according to claim 9, wherein the ion exchange reaction is achieved by heating the reactant and intermediate material under reflux.

14. A method of preparing a manganese oxide material, comprising processing a precursor material $Q_qMn_yM_nO_2$, where Q is a Group I element, M is an element, x and y are each a number greater than zero, and z is a number greater or equal to zero, by carrying out an ion removal reaction, so as to remove Q and produce a material of the form $Mn_yM_nO_2$ of ions, which ions are arranged in a series of generally planar layers stacked one on top of another with successive layers of oxide ions separated by alternating layers of Q ions, the layers thereby being arranged in a repeating sequence comprising a layer of Q ions, a layer of oxide ions, a layer of Mn ions and a further layer of oxide ions.

15. A method according to claim 14, wherein the ion removal reaction is achieved by an electrochemical cell having a working electrode constituted by the precursor material.

16. A method according to claim 14, wherein the material is of the form $Mn_yO_2$.

17. An electrochemical cell, wherein the positive electrode is of the form $Li_wMn_yM_zO_2$, where M is an element, y is a number greater than zero, and q and z are each a number greater than or equal to zero, and the material has a layered structure of ions, which ions are arranged in a series of generally planar layers stacked one on top of another with successive layers of oxide ions separated by alternating layers of Li ions, the layers thereby being arranged in a repeating sequence comprising a layer of Li ions, a layer of oxide ions, a layer of Mn ions and a further layer of oxide ions.

18. An electrochemical cell according to claim 17, wherein y and q are equal to one, and z is equal to zero, with the electrode being of the form $LiMnO_2$.

19. A rechargeable battery, comprising an electrochemical cell according to claim 17.

20. An electrochemical cell having a positive electrode of manganese oxide material according to claim 1, a negative electrode and electrolyte placed between the positive and negative electrodes.

* * * * *